(12) United States Patent
Sethuraman et al.

(10) Patent No.: US 8,676,559 B2
(45) Date of Patent: Mar. 18, 2014

(54) SYSTEM AND METHOD FOR PROVIDING EFFICIENT SCHEMATIC REVIEW

(75) Inventors: Saravanan Sethuraman, Bangalore (IN); John Francis Mullen, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 12/566,509

(22) Filed: Sep. 24, 2009

(65) Prior Publication Data

US 2011/0071800 A1 Mar. 24, 2011

(51) Int. Cl.
G06F 17/50 (2006.01)

(52) U.S. Cl.
USPC .......................................... 703/14; 716/111

(58) Field of Classification Search
USPC .......................................................... 703/14
See application file for complete search history.

(56) References Cited

U.S. PATENT DOCUMENTS

| | | | | |
|---|---|---|---|---|
| 5,155,836 A * | 10/1992 | Jordan et al. | | 703/23 |
| 5,461,576 A * | 10/1995 | Tsay et al. | | 716/113 |
| 5,617,327 A * | 4/1997 | Duncan | | 703/14 |
| 5,623,418 A | 4/1997 | Rostoker et al. | | |
| 5,828,580 A * | 10/1998 | Ho | | 716/115 |
| 5,872,952 A * | 2/1999 | Tuan et al. | | 714/724 |
| 6,289,116 B1 * | 9/2001 | Chamberlain et al. | | 382/141 |
| 6,366,874 B1 * | 4/2002 | Lee et al. | | 703/14 |
| 7,168,041 B1 * | 1/2007 | Durrill et al. | | 715/700 |
| 7,325,215 B2 * | 1/2008 | Dinter et al. | | 716/114 |
| 7,386,823 B2 * | 6/2008 | Tsai et al. | | 716/102 |
| 7,529,648 B2 * | 5/2009 | Baum et al. | | 703/1 |
| 7,966,588 B1 * | 6/2011 | Perry et al. | | 716/100 |
| 7,990,375 B2 * | 8/2011 | Kohli et al. | | 345/419 |
| 2006/0101368 A1 | 5/2006 | Kesarwani et al. | | |
| 2007/0229537 A1 | 10/2007 | Kohli et al. | | |
| 2008/0022251 A1 | 1/2008 | McConaghy et al. | | |

OTHER PUBLICATIONS

National Instruments, "Electronics Workbench Ultiboard 8 PCB Layout User Guide", Sep. 2005, pp. i-xiv, 10-1-10-3, Chapters 2, 3, 4, 6, 7, 11.*
Institute of Electrical and Electronics Engineering, Inc., "IEEE 100 The Authoritative Dictionary of IEEE Standard Terms", Seventh Edition, 2000, p. 725.*
: Linear Technology, "LTC3411" datasheet, 2002).*
Shiran, Yehuda, "Reverse Engineering as a Framework for Design Verification", ISCAS 1989.*
Cadence, "Virtuoso Schematic Composer User Guide", Product Version 4.4.6, Apr. 2001.*
SwitcherCAD III/LTspice Getting Started Guide, Linear Technology, Copyright 2008, USA.

* cited by examiner

*Primary Examiner* — Mary C Jacob
(74) *Attorney, Agent, or Firm* — Kenneth L. Sherman, Esq.; Michael Zarrabian, Esq.; Sherman & Zarrabian LLP

(57) ABSTRACT

A system and method for providing schematic reviews is provided. The method includes providing a schematic design, selecting a signal, where the signal is a graphical representation, previewing the signal, obtaining relevant information on components constituting the signal, and controlling the signal to obtain relevant information on the components. Controlling the signal comprises activating a link to a data compilation related to the signal component, and activating the data compilation comprises creating a link to a datasheet. The graphic representation of the signal comprises providing a block diagram overview of connectivity of the signal components and the graphical representation comprises a graphical three dimensional model, and providing a log database that includes review information provided by multiple reviewers and is accessible by the reviewers. A notation medium is provided for the reviewers for communication between the reviewers.

15 Claims, 8 Drawing Sheets

SYSTEM AND METHOD FOR PROVIDING EFFICIENT SCHEMATIC REVIEW

BACKGROUND OF THE INVENTION

1. Field of the Invention

The present invention relates to providing schematic reviews in the product development lifecycle for board design processes.

2. Background Information

Typically, in a product development life cycle, high speed board design process schematic design reviews are important and critical. Schematic design entries are conventionally undertaken via a schematic editor to check the quality of the schematic entry a design review and a checklist follows.

A schematic page by page check can be performed by printing or by an online review of the schematic design entry tool by clicking on each net, reviewing start and end points, and then analyzing. For a typical design, which can have upwards of 300 pages or 5000 nets, it is usually necessary to flip the page every time to check each signal to see its starting point and end point. Tracking the signal is a manual endeavor, and hence a tedious process which requires a high level of concentration in order to identify logical errors in the design.

The primary purpose of a design review is to identify problems such as typographical errors on the assigned signal names, and the logical connectivity problems for the signals in the schematic design, that may have a relatively large number of pages. It may take a couple of days to complete the schematic review of a design having for more than 300 pages.

Thus, a conventional solution for schematic design review may require the reviewer to print all schematic sheets and review them page by page by flipping through the sheets to the corresponding nets. This method of schematic design review is time consuming and presents a high error possibility.

Another conventional solution for schematic design review may require the reviewer to check/verify online using conventional tools. For example, the reviewer may need to click on, "find net" or "highlight net". This would show all the nets which are connected to the signal. However, there is a need to click each signal and see whether it is connected properly or not. This method of review can be highly confusing and cumbersome for a reviewer.

SUMMARY OF THE INVENTION

An embodiment of the invention comprises a method for providing schematic reviews for high speed board designs that includes providing a schematic design, selecting a signal in the schematic design, where the signal is provided as a graphical representation, previewing the signal, and obtaining relevant information on components constituting the signal.

In another embodiment, a system that comprises a memory configured to accept a schematic design, and an interface coupled to the memory. The interface selecting a signal in the schematic design, where the signal is provided as a graphical representation, the interface configured for previewing the selected signal, the interface configured for obtaining relevant information on components constituting the selected signal.

In another embodiment, a computer program product comprising a tangible computer readable recordable storage medium including computer useable program code for providing a schematic design, selecting a signal in the schematic design provided, wherein the signal is provided as a graphical representation, previewing the selected signal, and obtaining relevant information on components constituting the selected signal.

DESCRIPTION OF THE PREFERRED EMBODIMENTS

Figure 1:
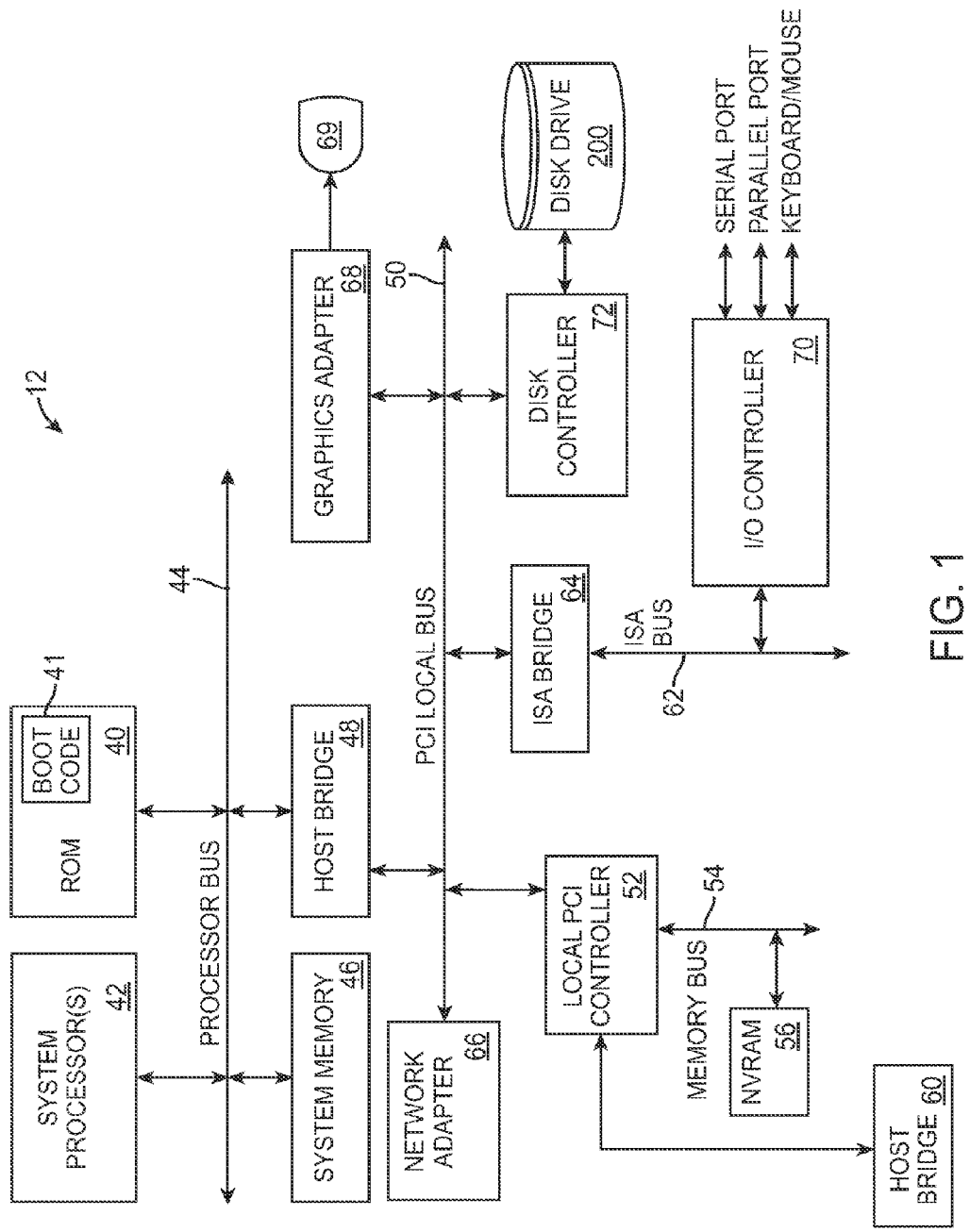
FIG. 1 is a schematic view of a computer system.

As will be appreciated by one skilled in the art, embodiments of the present invention may be implemented as a system, method, or computer program product. Accordingly, embodiments of the invention may take the form of an entirely hardware embodiment, an entirely software embodiment, including firmware, resident software, micro-code, etc., or an embodiment combining software and hardware aspects that may all generally be referred to herein as a "circuit," "module" or "system." Furthermore, embodiments of the invention may take the form of a computer program product implemented in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Embodiments of the invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

It will be readily understood that the components of the embodiments of the invention, as generally described and illustrated in the Figures herein, may be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of selected embodiments of the invention Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention Referring now to FIG. 1, there is shown an embodiment of a computer system 12, which may be employed in accordance with one or more embodiments of the invention. It is to be understood that the system 12 is provided by way of an illustrative and non-restrictive example and that of course other types of computer systems can be employed with the embodiments of the invention set forth herein.

Computer system 12 may be a notebook computer system, such as one of the ThinkPad series of personal computers previously sold by the International Business Machines Corporation of Armonk, N.Y., and now sold by Lenovo (US) Inc. of Morrisville, N.C. However, as will become apparent from the following description, the invention is applicable to any data processing system, including portable electronic devices such as PDA, mobile phones etc. Notebook computers may alternatively be referred to as "notebooks", "laptops", "laptop computers" or "mobile computers" herein, and these terms should be understood as being essentially interchangeable with one another.

As illustrated in FIG. 1, the computer system 12 includes at least one system processor 42, which is coupled to a Read-Only Memory (ROM) 40 and a system memory 46 by a processor bus 44. System processor 42 may be a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN (not shown), and graphics adapter 68, which interfaces computer system 12 with display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. It should be appreciated that the system 12 may be built with different chip sets and different bus structures, as well as with any other suitable substitute components, while providing comparable or analogous functions to those discussed.

The computer system 12, or essentially any other suitable or analogous system, can be employed to carry out the inventive processes as set forth below; for instance, display 66 of system 12 could be employed to provide the screen displays illustrated in FIGS. 2-4.

Figure 2:
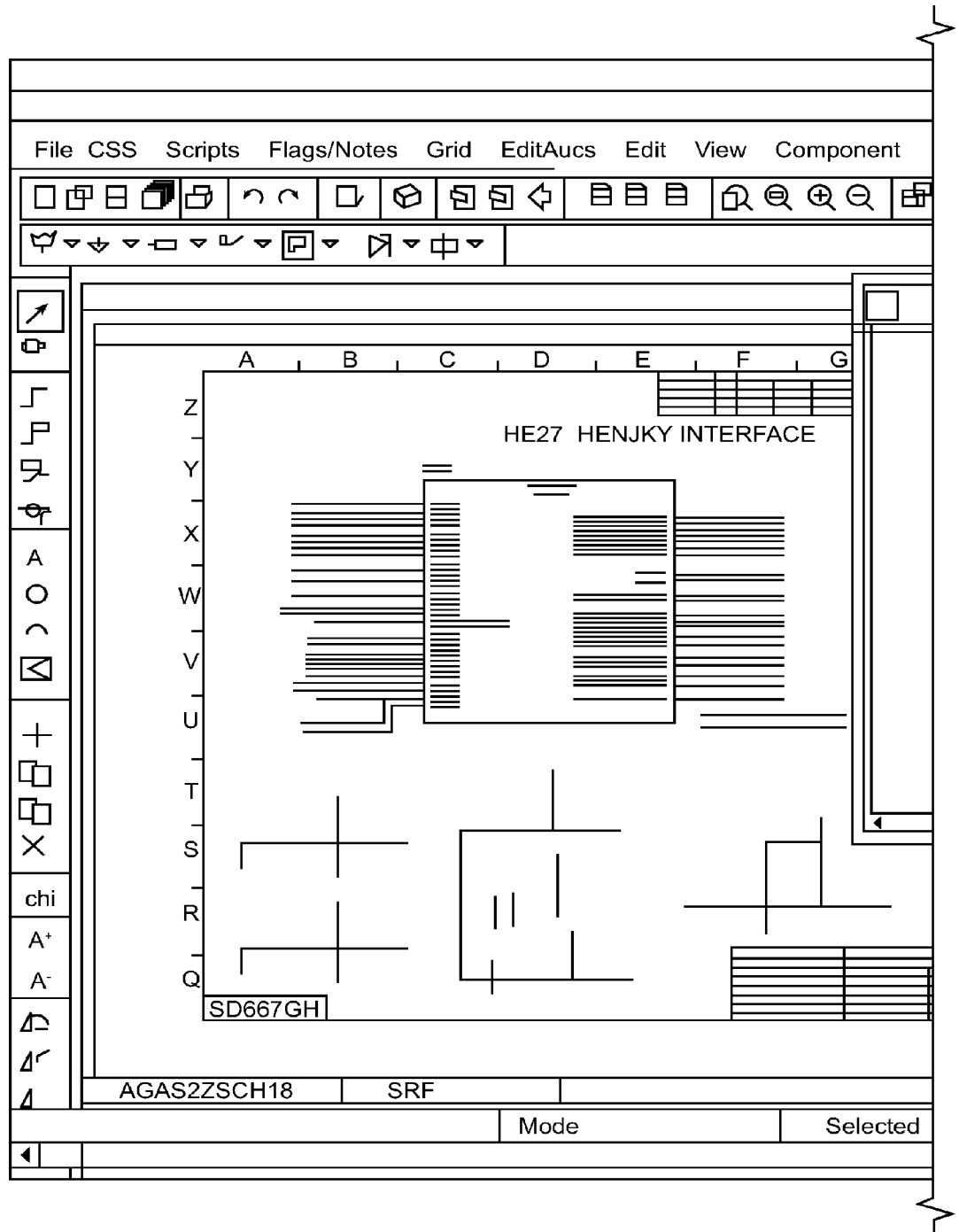
FIG. 2 is a schematic view of showing a schematic design review tool displayed on a monitor.
Figure 2:
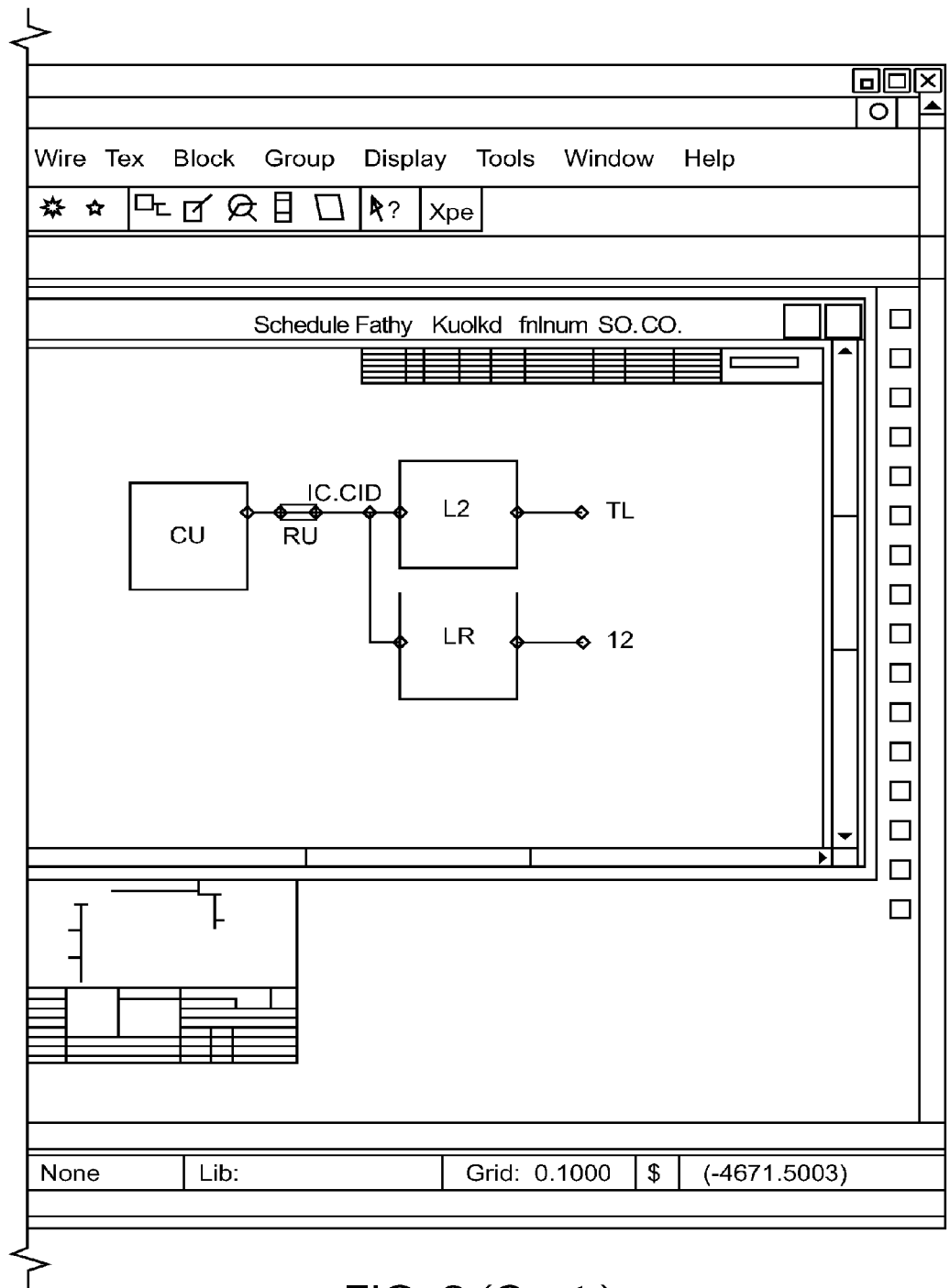
Figure 3:
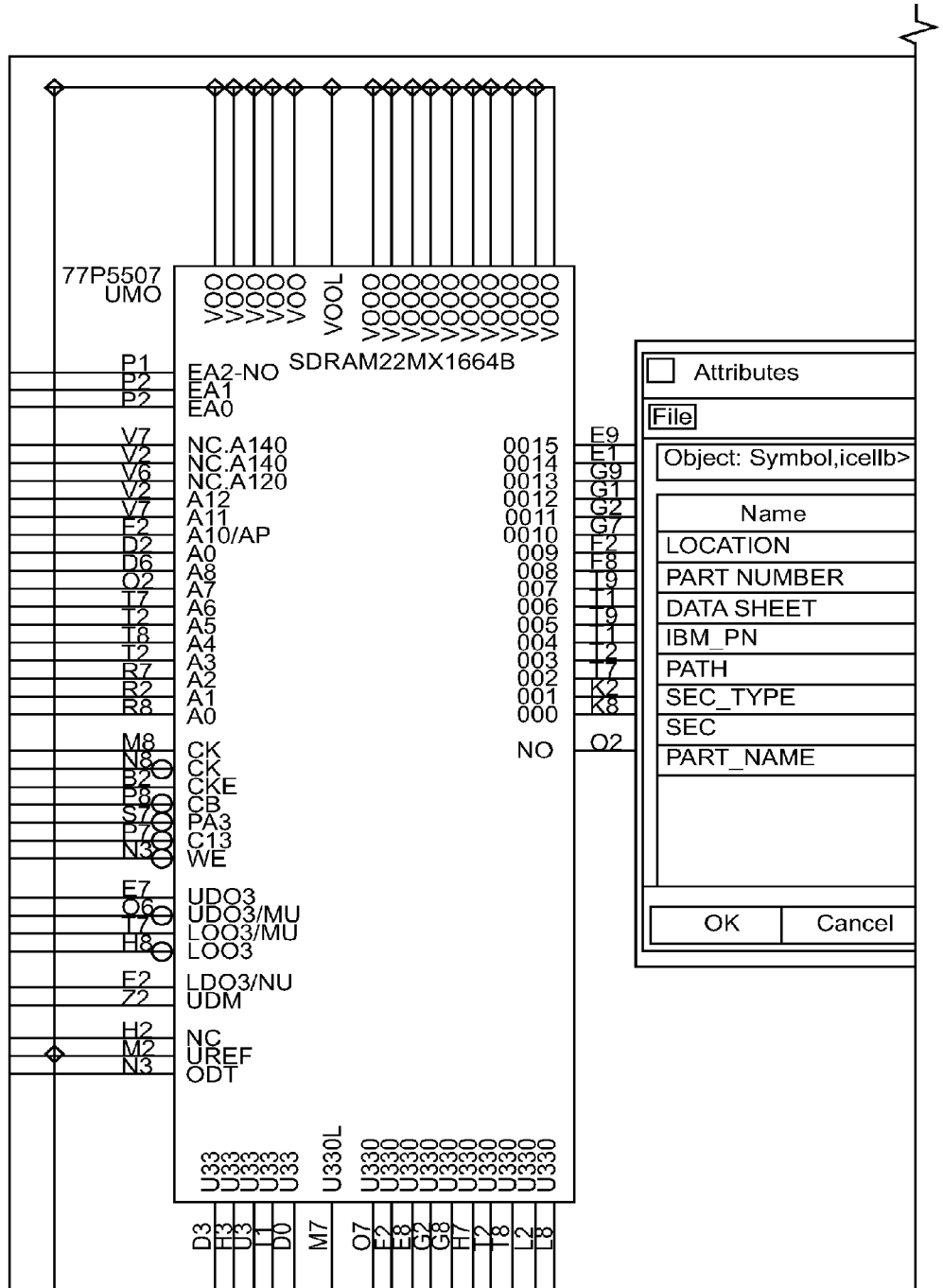
FIG. 3 is another schematic view of the schematic design review tool.
Figure 3:
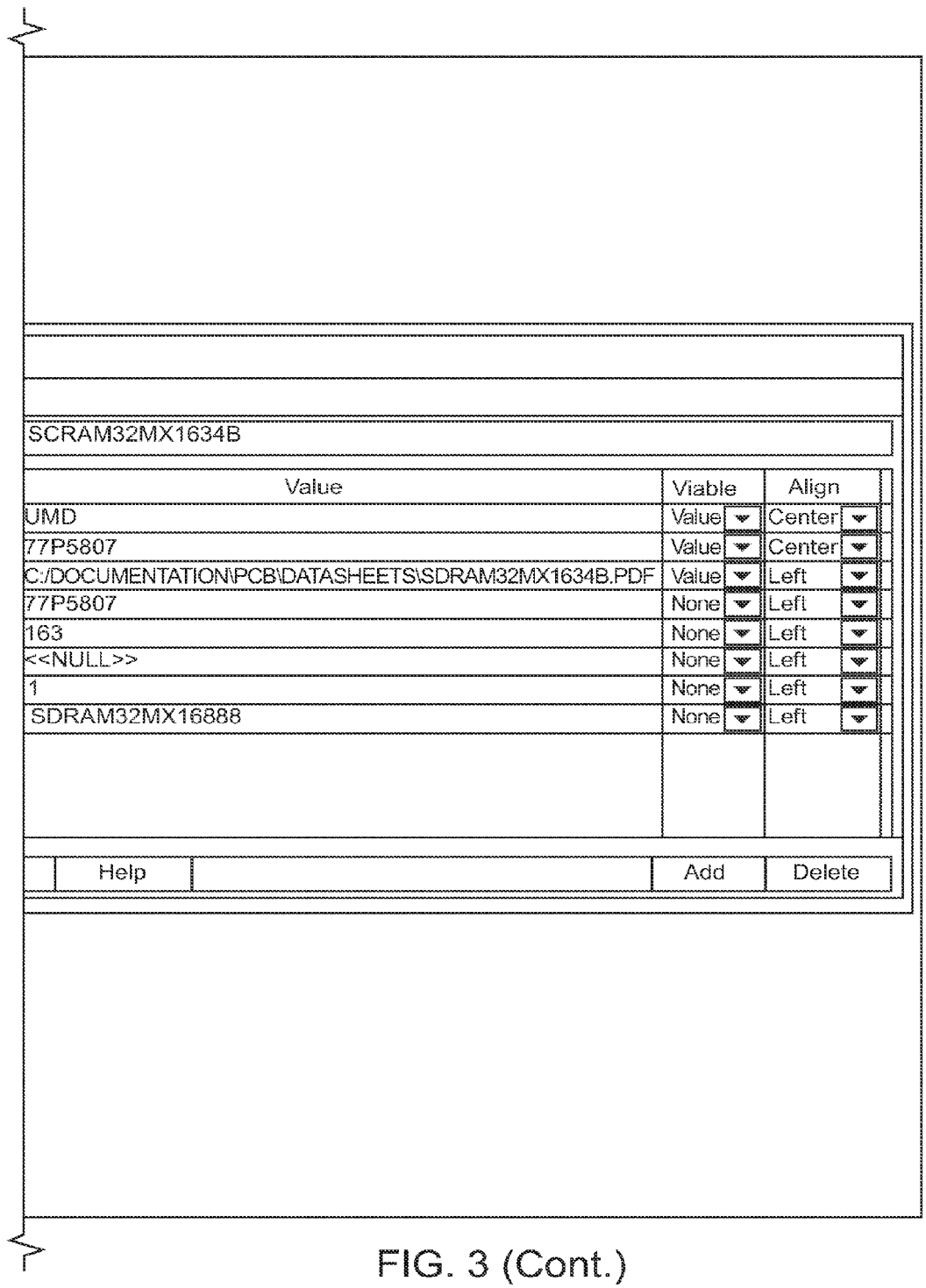
Figure 4:
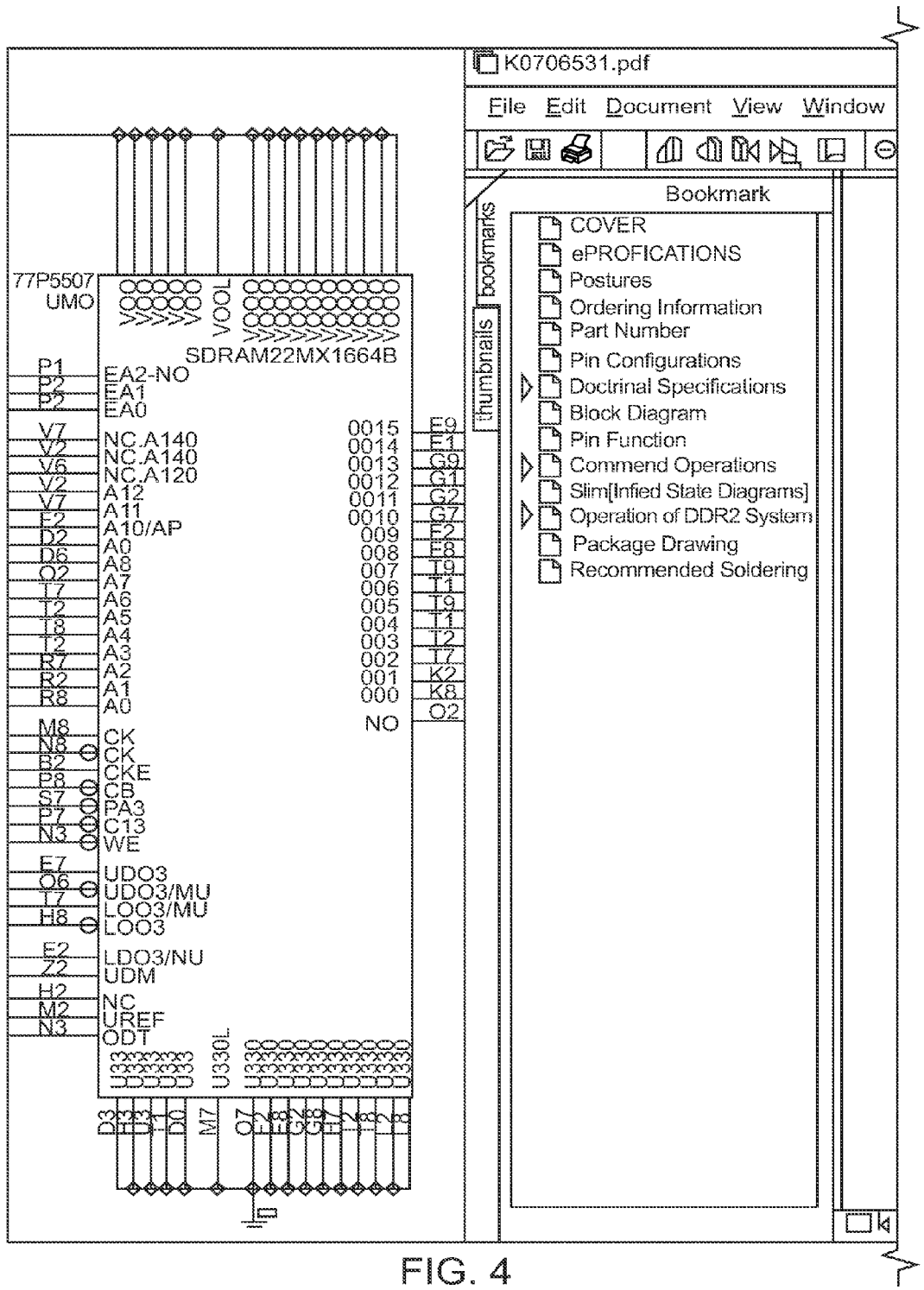
FIG. 4 is another schematic view of showing the schematic design review tool displayed on a monitor.
Figure 4:
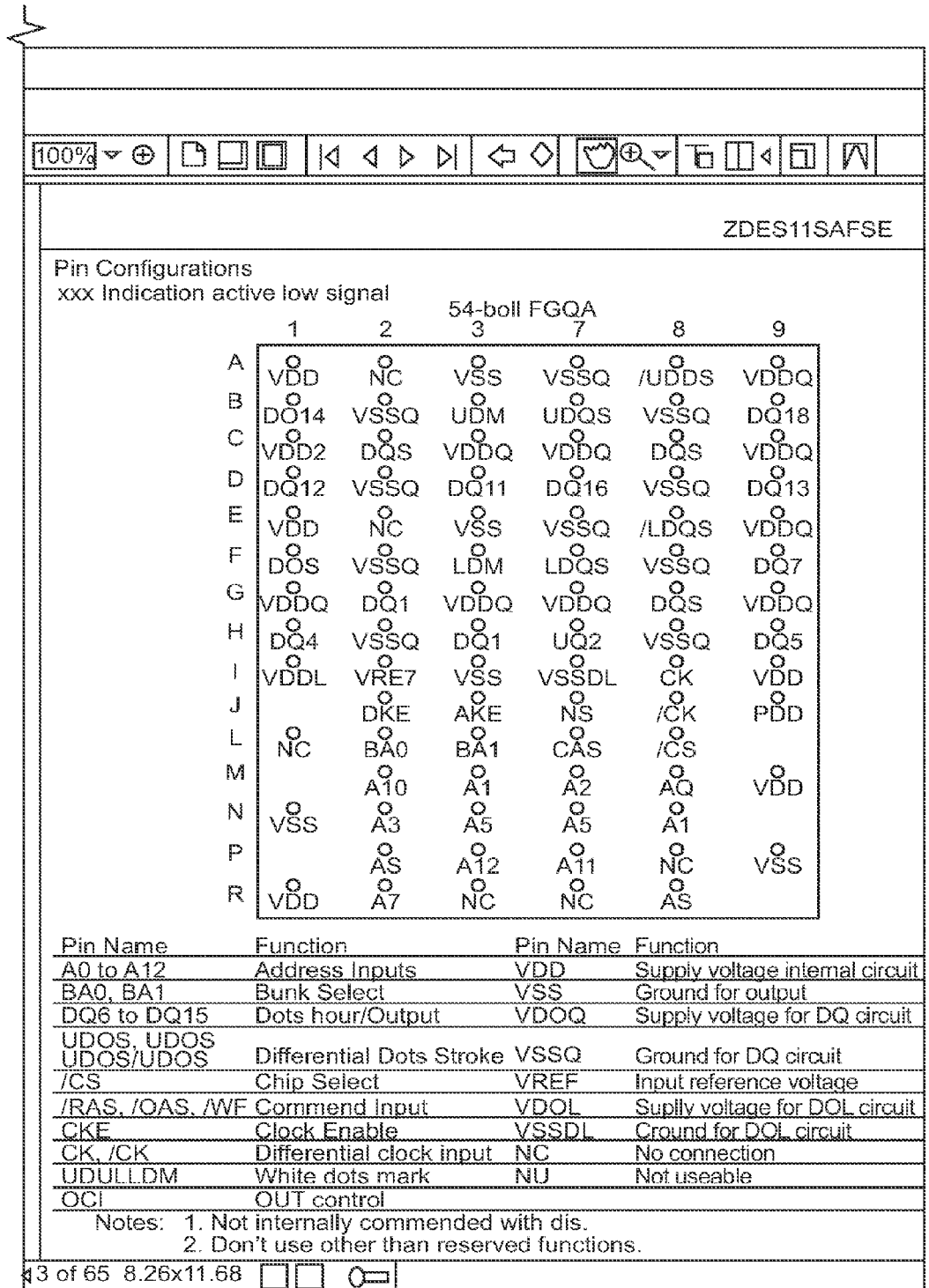

Referring to FIGS. 2-4, according to one embodiment, a method that provides the provision of a preview of each signal, when selected in a schematic design editor tool in a pictorial representation. When a user clicks on a new schematic review environment (SRE) icon, a new window can be displayed with a block diagram showing how the signal is connected to different components (shown in FIG. 2). By doing this, a reviewer/user can ensure that the signal overall view is captured in one place, thus obviating a need to flip through each schematic page manually for every signal.

When performing an online review, the reviewer/user does not need to click on the signal search results for each signal, which could be many. This substantially reduces the schematic review time. The reviewer/user can spend time more productively and an undesirable re-spin of the board can often be avoided (which otherwise might be necessitated by some simple mistakes on the logical connections in the processor or a main ASIC used in the board.)

In one embodiment, a datasheet is attached to the symbols used in the schematic design editor tool. In this embodiment, a single mouse click on a symbol can show a link to the location where the datasheet is stored, while a double mouse click could open the datasheet for the selected symbol. To enable this feature, the symbol datasheet could be attached to the symbol attributes or give the link to the symbol in some central database where it could be located, shown in FIG. 3. This allows the schematic reviewer/user to check the footprint information, pin information, pin description, functional information, electrical parameters, and so forth, enabling the reviewer/user to work more effectively and efficiently. An example of the datasheet so appearing on the display screen is shown in FIG. 4.

In one embodiment, the method may also be employed to attach 3D (Pro E) models of the symbol, as normally may be used in mechanical and industrial design to ensure that the components' height and orientation are consistent with design requirements. Of note: should the schematic reviewer/user desire to view the 3D models of the symbol, then corresponding software such as Pro E should be installed in the computer system 12 (not discussed or disclosed herein.

In view of the foregoing, it can also be appreciated that a schematic design review may be done independently by a reviewer/user, i.e., performing a logical review, mechanical review, or industrial review, using the invention, without involving a team. This functionality could save the time of the designers involved in the board design. Multiple reviewers/users could do the review at the same time by looking at the review log database.

In one embodiment, the method can be enabled when a design entry is complete and the net-list for that design is complete. Also, a symbol designer may have attached an attribute for the datasheet of the part in the symbol, while creating a logical symbol.

Figure 5:
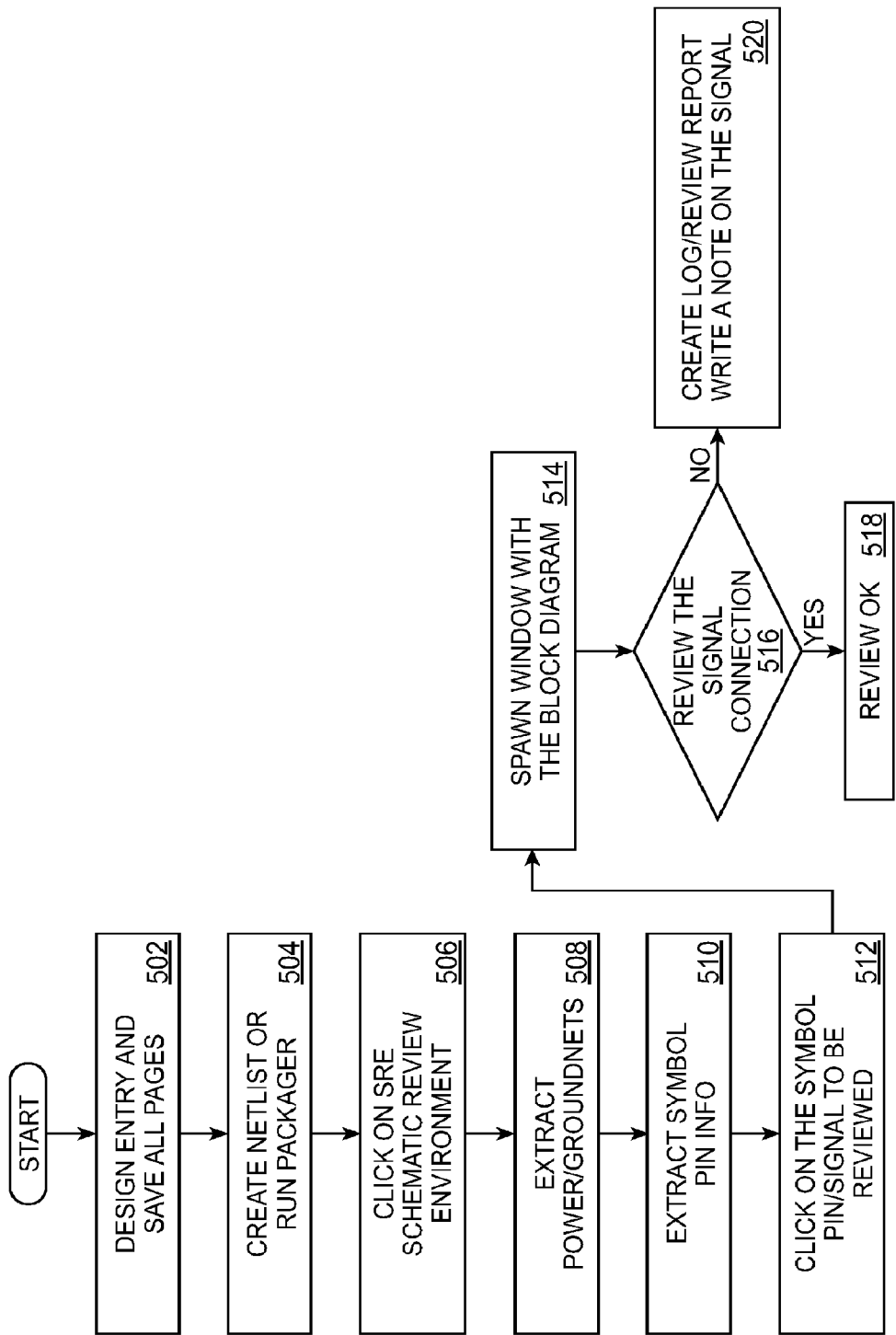
FIG. 5 flow diagram showing a method for employing the schematic design review tool of the invention.

Referring now to FIG. 5, there is shown a flow diagram illustrating an embodiment of a method of a schematic design editor tool. Execution of the method commences in START block. In process block 502, a design entry is completed and the pages of the design are saved. Next, in process block 504, a net-list for the entered design is created. In process block 506, a schematic review platform is enabled by clicking a Schematic Review Environment (SRE) icon.

By enabling the review platform, the platform will generate the symbols required for the review by seeing the net-list like Chip/ASIC, resistor, connector, capacitor, inductor, diode, LED, etc., along with an arrangement for showing the symbols which are connected in the schematic design.

In process block 508, the review platform extracts all power and ground nets. Thereafter, all symbol pin information and the datasheet for the corresponding symbol may be extracted, shown in process block 510. Next, process block 512, a symbol pin or signal is selectively clicked on in order to be reviewed. In process block 514, a background process may then generate a small window which shows a block diagram of the connectivity of the pin from the net-list, which was created at step 504. For example, a processor (U1) pin 4 could be connected to a resistor to a 3.3V source.

Thus, the method can create a small box for the U1 chip and a rectangle symbol for the resistor and a standard voltage source. Once a corresponding window pops-up (shown in FIG. 2), then the reviewer/user can click on the U1 to see the attributes and a link to the datasheet (see FIG. 3); this may involve, going to a page where a U1 schematic symbol is available, where double clicking on the symbol will open the datasheet (see FIG. 4). In decision block 516, the reviewer/user may review the datasheet to confirm whether the correct pin is at hand or not.

If the connection is correct, then the reviewer/user may click on "OK", in process block 518, where a log/review report can be created in text format and saved in a folder dedicated to schematic review (e.g., folder "sch_1") along with schematic pages. Another pin or symbol can then be reviewed in process block 512. This review log could be in a database serving as a central location for the project where multiple users can gain access, whereby multiple reviewers or designers can see the review output.

If the connection is determined not to be correct, in decision block 516, then a new log/review report can be created for which a note can be written on the signal, in process block 520. By writing a note on the signal, it can be ensured that other reviewers will not have to review the schematic in regards to the incorrect connection, while allowing a designer to correct the error without having to interact with a reviewer/user. The method then ends.

To review this process more generally, the tool may generate a standard model (e.g., basic graphics such as a rectilinear box) for each general component, e.g., Silicon/ASIC, Resistor, Capacitor, Inductor, Transistor, Connector etc. Once the schematic review platform is enabled, symbols can be newly created in parallel to a user performing the schematic entry. This thus can present an even greater degree of interactive user review; the tool, e.g., could query the designer if a new symbol with a newly distinct reference designator is to be used in the design by opening a new window with list of general names of the components; in this way, the tool may create the symbol as appropriate along with the corresponding pins.

By way of elaborating on the method, and returning to FIG. 2, there is shown an illustrative and non-restrictive example of an SRE in accordance with one embodiment. Initially, the SRE icon may be clicked to create all required shapes for a "bird's eye" view. Thereafter, the net that needs to be reviewed can be clicked. As shown, a window (the pop-up) can then be created that has a block diagram or bird's eye view of the signal and of how it is connected, including pin numbers of the chip. Thus obtained is a powerful utility for doing schematic review and for finding out logical and manual errors in connecting the nets.

A single click on "U1" may yield attributes thereof; this is shown in FIG. 3 (in the pop-up). These attributes can already be readily attainable via the schematic review tool. However, more extensive information, as discussed heretofore, can be attained via the link to the datasheet (such as shown in the pop-up in FIG. 3).

Thus, the invention may reduce the occurrence of a re-spin of a board which may provide a cost savings. Time savings, particularly for reviewers/users, are attainable. For instance, there is no need for online review, unless required, and a reviewer/user may perform a design review independently, without a need for consulting team members or a designer. The method substantially reduces the probability of manual error and product life cycle time may be reduced, by way of employing an embodiment of the semi-automated schematic design review herein.

It is to be understood that the present invention, in accordance with at least one embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

Generally, embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method for providing schematic reviews for high speed board designs, the method comprising:
   providing a schematic design;
   creating a complete net-list for the schematic design;
   enabling a schematic review platform that generates electronic circuitry component symbols required for a schematic review using a display window;
   extracting all power and ground nets by the review platform;
   extracting all symbol pin information and a datasheet for a corresponding symbol;
   selecting a symbol pin or signal in the display window for the schematic review, where the signal and the symbol pin are provided as pictorial representations in the display window;
   based on the selected symbol pin or signal, generating a window showing a block diagram showing actual connectivity of the selected symbol pin or signal selected from the created net-list; and
   selecting a symbol from the window showing the block diagram for displaying a link to a location where a corresponding datasheet for the selected symbol is stored, or opening the corresponding datasheet for viewing,
   wherein the schematic review is enabled based on selecting an icon, wherein the review platform provides for displaying the block diagram showing how the selected signal is actually connected to different components in an overall view comprising a plurality of shapes corresponding to each of the electronic circuitry component symbols.

2. The method of claim 1, further comprising activating the link to the datasheet related to the selected component symbol wherein a first mouse action on the selected component symbol provides for showing the link to the location where the corresponding datasheet is stored, and a second mouse action on the component symbol provides for opening the corresponding datasheet for the selected symbol component and for obtaining relevant information comprising footprint information, pin information, pin description and electrical parameters.

3. The method of claim 2, further comprising:
   querying a user for information if a new symbol with a distinct reference designator is to be used in a design being reviewed, and opening a new window with a list of general names of components.

4. The method of claim 3, wherein a graphical three dimensional model is attached to an electronic circuitry component symbol for checking component height and orientation.

5. The method of claim 1, further comprises using an interface for entering information related to the selected signal or the selected symbol pin; and providing a log database associated with the selected signal or the selected symbol pin, the log database accessible by multiple reviewers via the interface, wherein the log database includes review information provided by the multiple reviewers for the selected signal or the selected symbol pin.

6. The method of claim 5, further comprising availing a notation medium via the interface for the multiple reviewers for communication between the multiple reviewers for information related to the selected signal or the selected symbol pin.

7. A system comprising
   a memory that accepts a complete net-list created by a processor based on an entered schematic design;
   the processor enables a schematic review platform that generates electronic circuitry component symbols required for a schematic review using a display window, wherein the schematic review platform extracts all power nets and ground nets, and thereafter extracts all symbol pin information and a datasheet for a corresponding symbol; and
   an interface coupled to the memory, the interface is configured for selecting a signal or a symbol pin in the schematic design, where the signal and the symbol pin are provided as pictorial representations, based on the selected signal or the selected symbol pin, the processor generates a window showing a block diagram showing actual connectivity of the selected signal or symbol pin from the created net-list, wherein the interface is configured for selecting a symbol from the window showing the block diagram for displaying a link to a location where a corresponding datasheet for the selected symbol is stored, or opening the corresponding datasheet for viewing, and wherein the interface is configured for selecting an icon for enabling the schematic review platform that provides for displaying the block diagram showing how the selected signal is actually connected to different circuitry components in an overall view comprising a plurality of shapes corresponding to each of the electronic circuitry component symbols.

8. The system of claim 7, further comprising activating the link to the datasheet related to the selected component symbol, wherein a first mouse action on the selected component symbol provides for showing the link to the location where the corresponding datasheet is stored, and a second mouse action on the selected component symbol provides for opening the corresponding datasheet for the selected symbol component and for obtaining relevant information comprising footprint information, pin information, pin description and electrical parameters.

9. The system of claim 8, wherein a graphical three dimensional model is attached to an electronic circuitry component symbol for checking component height and orientation.

10. The system of claim 9, further comprises using the interface or entering information related to the selected signal or the selected symbol pin; and providing a log database associated with the selected signal or the selected symbol pin, the log database accessible by multiple reviewers via the interface, wherein the log database includes review information provided by the multiple reviewers for the selected signal or the selected symbol pin.

11. The system as claimed in claim 10, further comprising availing a notation medium for the multiple reviewers for communication between the multiple reviewers for information related to the selected signal or the selected symbol pin.

12. A computer program product comprising a non-transitory tangible computer readable recordable storage medium including computer useable program code for:
- providing a schematic design;
- creating a complete net-list for the schematic design;
- enabling a schematic review platform that generates electronic circuitry component symbols required for a schematic review using a display window;
- extracting all power and ground nets by the schematic review platform;
- extracting all symbol pin information and a datasheet for a corresponding symbol;
- selecting a symbol pin or signal in the display window for the schematic review, wherein the signal and the symbol pin are provided as pictorial representations in the display window;
- based on the selected signal or the selected symbol pin, generating a window showing a block diagram showing actual connectivity of the selected signal or symbol pin selected from the created net-list; and
- selecting a symbol from the window showing the block diagram for displaying a link to a location where a corresponding datasheet for the selected symbol is stored, or opening the corresponding datasheet for viewing,
- wherein the schematic review is enabled based on selecting an icon, wherein the review platform provides for displaying the block diagram showing how the selected signal is actually connected to different components in an overall view comprising a plurality of shapes corresponding to each of the electronic circuitry component symbols.

13. The computer program product as claimed in claim 12, wherein a first mouse action on the selected symbol provides for showing the link to the location where the data sheet is stored, and a second mouse action on the selected symbol provides for opening the corresponding datasheet for the selected symbol and for obtaining relevant information comprising footprint information, pin information, pin description and electrical parameters.

14. The computer program product as claimed in claim 12, wherein a graphical three dimensional model is attached to the selected symbol for checking component height and orientation.

15. The computer program product as claimed in claim 12, further comprises using an interface for entering information related to the selected signal or the selected symbol pin; and providing a log database associated with the selected signal or the selected symbol pin, the log database accessible via the interface by multiple reviewers wherein the log database includes review information provided by the multiple reviewers for the selected signal or the selected symbol pin; and availing a notation medium via the interface for the multiple reviewers for communication between the multiple reviewers for information related to the selected signal or the selected symbol pin.

* * * * *